United States Patent
Canourgues et al.

(10) Patent No.: US 10,473,130 B2
(45) Date of Patent: *Nov. 12, 2019

(54) STEEL PART

(71) Applicant: ArcelorMittal France, La Plaine Saint-Denis (FR)

(72) Inventors: Jean-Francois Canourgues, Nogent sur Oise (FR); Aurelien Pic, Paris (FR); Pascal Verrier, Lumbres (FR); Rene Vierstraete, Maisons-Laffitte (FR); Wolfram Ehling, Ghent (BE); Bernd Thommes, Okemos, MI (US)

(73) Assignee: ArcelorMittal France, La Plaine Saint-Denis (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,901

(22) Filed: May 16, 2019

(65) Prior Publication Data

US 2019/0271341 A1    Sep. 5, 2019

Related U.S. Application Data

(60) Continuation of application No. 15/585,575, filed on May 3, 2017, which is a division of application No.
(Continued)

(30) Foreign Application Priority Data

Apr. 19, 2006    (WO) ................ PCT/FR2006/000898

(51) Int. Cl.
*F16B 5/08*    (2006.01)

(52) U.S. Cl.
CPC ............. *F16B 5/08* (2013.01); *Y10T 403/479* (2015.01)

(58) Field of Classification Search
CPC ... B23K 2201/18; B23K 2201/34; F16B 5/08; Y10T 403/477; Y10T 403/478; Y10T 403/479
(Continued)

(56) References Cited

U.S. PATENT DOCUMENTS 2,062,457 A    12/1936    Johnston
2,914,641 A    11/1959    Yuhasz
(Continued)

FOREIGN PATENT DOCUMENTS

CN    86103008    6/1987
CN    1412465 A    4/2003
(Continued)

OTHER PUBLICATIONS

The Office Action issued in connection with U.S. Appl. No. 13/311,731 dated Sep. 18, 2012.
(Continued)

*Primary Examiner* — Josh Skroupa
(74) *Attorney, Agent, or Firm* — Davidson, Davidson & Kappel, LLC

(57)    ABSTRACT

A formed steel part includes a first steel plate having a first base, a first intermetallic alloy layer on the first base and a first metal alloy layer on the first intermetallic alloy layer, the first steel part having a first area without the first metal alloy layer and having at least part of the first intermetallic alloy layer; and a second steel plate having a second base, a second intermetallic alloy layer on the second base and a second metal alloy layer on the second intermetallic alloy layer, the second steel part having a second area without the second metal alloy layer and having at least part of the second intermetallic alloy layer in the second area. The first
(Continued)

and second steel plates are joined together. The formed steel part may also include a butt-weld joining the first and second steel plates.

16 Claims, 4 Drawing Sheets

Related U.S. Application Data

14/865,793, filed on Sep. 25, 2015, now Pat. No. 9,669,491, which is a continuation of application No. 13/311,731, filed on Dec. 6, 2011, now Pat. No. 9,597,750, and a continuation of application No. 14/070,132, filed on Nov. 1, 2013, now Pat. No. 9,682,443, which is a continuation of application No. 12/293,898, filed on Nov. 25, 2008, now Pat. No. 8,614,008, which is a continuation of application No. 12/293,898, filed as application No. PCT/FR2007/000536 on Mar. 29, 2007, now Pat. No. 8,614,008.

(58) Field of Classification Search
USPC .......................................... 403/270, 271, 272
See application file for complete search history.

(56) References Cited

U.S. PATENT DOCUMENTS

| | | | |
|---|---|---|---|
| 3,479,730 A | 11/1969 | Poth | |
| 3,989,919 A | 11/1976 | Wefers et al. | |
| 4,037,073 A | 7/1977 | Becker | |
| 4,073,427 A * | 2/1978 | Keifert | B23K 9/23 403/272 |
| 4,401,727 A | 8/1983 | Berke et al. | |
| 4,462,533 A | 7/1984 | Furr | |
| 4,474,861 A | 10/1984 | Ecer | |
| 4,758,703 A | 7/1988 | Drever et al. | |
| 4,818,629 A | 4/1989 | Jenstrom et al. | |
| 4,902,872 A | 2/1990 | Frings | |
| 5,343,014 A | 8/1994 | Ogino et al. | |
| 5,344,062 A | 9/1994 | Krengel | |
| 5,389,761 A | 2/1995 | Kresse, Jr. | |
| 5,510,597 A | 4/1996 | Kampmann et al. | |
| 5,587,537 A | 12/1996 | Simmons | |
| 5,591,360 A * | 1/1997 | Mombo-Caristan | B23K 15/006 219/121.64 |
| 5,618,452 A | 4/1997 | Matubara | |
| 5,828,032 A | 10/1998 | Krys et al. | |
| 6,290,905 B1 | 9/2001 | Watanable | |
| 6,295,805 B1 | 10/2001 | Laurent et al. | |
| 6,296,805 B1 | 10/2001 | Laurent | |
| 6,395,407 B2 | 5/2002 | Mareuse et al. | |
| 6,407,363 B2 | 6/2002 | Dunsky et al. | |
| 6,621,040 B1 | 9/2003 | Perry et al. | |
| 6,814,815 B2 | 11/2004 | Voges | |
| 6,936,118 B2 | 8/2005 | Ando et al. | |
| 7,241,971 B2 | 7/2007 | Bonnet et al. | |
| 7,431,197 B2 | 10/2008 | Franchet et al. | |
| 7,633,033 B2 | 12/2009 | Thomas et al. | |
| 7,910,218 B2 | 3/2011 | Lin et al. | |
| 7,943,883 B2 | 5/2011 | Doira et al. | |
| 8,409,725 B2 | 4/2013 | Hashimura et al. | |
| 8,471,173 B2 | 6/2013 | Miessbacher et al. | |
| 8,475,609 B2 | 7/2013 | Liu et al. | |
| 8,614,008 B2 | 12/2013 | Canourgues | |
| 9,375,809 B2 | 9/2016 | Canourgues | |
| 2001/0016268 A1 | 8/2001 | Maki et al. | |
| 2001/0042393 A1 | 11/2001 | Kefferstein et al. | |
| 2004/0247932 A1 | 12/2004 | Kagohara et al. | |
| 2005/0020087 A1 | 1/2005 | Wagner et al. | |
| 2005/0136184 A1 | 6/2005 | Voges | |
| 2005/0196633 A1 | 9/2005 | Doh et al. | |
| 2005/0211687 A1 | 9/2005 | Sonoda et al. | |
| 2006/0000813 A1 | 1/2006 | Engler et al. | |
| 2006/0144826 A1 | 7/2006 | Becker et al. | |
| 2009/0220815 A1 | 9/2009 | Canourgues et al. | |
| 2010/0098969 A1 | 4/2010 | Hashimura | |
| 2016/0010174 A1 | 1/2016 | Canourgues | |

FOREIGN PATENT DOCUMENTS

| | | |
|---|---|---|
| CN | 1550283 | 12/2004 |
| DE | 10315976 | 10/2004 |
| EP | 0279866 A1 | 8/1988 |
| EP | 0971044 | 1/2000 |
| EP | 1143029 | 10/2001 |
| FR | 2827874 A1 | 1/2003 |
| JP | S61159292 A | 7/1986 |
| JP | H04200872 A | 7/1992 |
| JP | H04200872 A | 7/1992 |
| JP | H0557468 A | 3/1993 |
| JP | H0741842 B2 | 2/1995 |
| JP | H07155952 A | 6/1995 |
| JP | H09314337 A | 12/1997 |
| JP | 10168545 | 6/1998 |
| JP | H10176287 A | 6/1998 |
| JP | 2002219589 A | 8/2002 |
| JP | 2002256407 A | 9/2002 |
| JP | 2003-183802 | 3/2003 |
| JP | 2004090045 A | 3/2004 |
| JP | 2006021224 A | 1/2006 |
| JP | 2006218518 A | 8/2006 |
| KR | 10-2004-0058615 | 7/2004 |
| KR | 100551797 B1 | 2/2006 |
| RU | 2144452 C1 | 1/2000 |
| RU | 2155655 C2 | 9/2000 |
| RU | 2186145 C2 | 7/2002 |
| RU | 2186871 C2 | 8/2002 |
| RU | 2355541 C2 | 5/2009 |
| WO | 0234456 A1 | 5/2002 |
| WO | 2005107996 A2 | 11/2005 |

OTHER PUBLICATIONS

The Office Action issued in connection with U.S. Appl. No. 13/311,731 dated Feb. 1, 2013.
The Office Action issued in connection with U.S. Appl. No. 12/293,898 dated Apr. 13, 2011.
The Office Action issued in connection with U.S. Appl. No. 12/293,898 dated Aug. 5, 2011.
The Office Action issued in connection with U.S. Appl. No. 12/293,898 dated Feb. 13, 2012.
The Office Action issued in connection with U.S. Appl. No. 12/293,898 dated Sep. 7, 2012.
The Office Action issued in connection with U.S. Appl. No. 12/293,898 dated Dec. 3, 2012.
Changfu, Liu. Revised by Zhang Wanyi. "Hot Aluminizing Steel Plate." Wisco Technology. Jul. 1993.
Guangan, Gao, et al. "Investigation into Values for the Width of Weld HAZ." Sep. 1989.
"Numerical Model of Seam Shaping during Welding of Stainless Steel by Laser." Oct. 2005.
Suehiro, Masayoshi et al. "Properties of Aluminum-coated Steels for Hot-forming." Nippon Steel Technical report No. 88. Jul. 2003. pp. 16 to 21.
Youqing, Jiang et al. "Experiment for Weldability of Aluminum-Plated Steel Plate with Arc Welding." Welding & Joining. Oct. 1991. pp. 6 to 8.
Banjin, Liu et al. "Continuous Hot-Dip Aluminizing Process of Steel Strip and Structure of Coating." Iron and Steel. vol. 26. No. 11. Nov. 1991.
Jie, He Jun et al. "Welding of Alumetized Steel." Apr. 1989.
"Study of Laser Welding of 400 MPA Super Steel and its Weldability." Institute of Scientific & Technical Information of Shanghai. Feb. 2004.
Yuanfei, Yan. Reviewed by Jia Andong. "Chapter 2 Welded Joint and the Design Thereof." Welding Handbook (Version 2). 2001.

(56) References Cited

OTHER PUBLICATIONS

Modest, Michael F. "Table B.1. Total Emittance and Solar Absorptance of Selected Surfaces." Radiative Heat Transfer Second Edition. Academic Press. 2003. p. 746.
Zhu, Liang and Jianhong Chen. "Mechanical Properties of Welded Joints of Fine-Grained Steels with Softened Heat-Affected Zone." Journal of Gansu University of Technology vol. 29. No. 4. Dec. 2004.
Michael F. Modest: "Radiative Heat Transfer", Second Edition 2nd Edition, Mar. 21, 2003, 10 pages.
R.W. Richards et a.: "Metallurgy of continuous hot dipping aluminising", International Materials Reviews 1994, vol. 39, No. 5, 191 to 212.
"Hot-Dip Aluminizing of Steel", Oct. 1995, ISBN:7-5024-1590-4, 11 pages including English Translation.
New Progess in Steel-Sheet Coating and Plating Products, On Steel & Technology, Jun. 2000, 25 pages including translation.
"Base." Google.com. [online], [retrieved on Oct. 25, 2018]. Retrieved from the Internet <URL: https://www.google.com/search?q=u define%3A+base>.
Saf, Safdual ZN "Fiche de Donnees de Securite", Dec. 12, 1999, see English translation.

\* cited by examiner

STEEL PART

CROSS REFERENCE TO RELATED APPLICATIONS

This is a continuation of U.S. Ser. No. 15/585,575, filed May 3, 2017 which is a divisional of U.S. application Ser. No. 14/865,793, filed on Sep. 25, 2015, now U.S. Pat. No. 9,669,491, which is a continuation of U.S. patent application Ser. No. 14/070,132, filed Nov. 1, 2013, now U.S. Pat. No. 9,682,443, and U.S. patent application Ser. No. 13/311,731 filed on Dec. 6, 2011, now U.S. Pat. No. 9,597,750, which are continuations of U.S. Pat. No. 8,614,008 issued on Dec. 24, 2013, which is a national stage application of PCT/FR2007/00536 filed on Mar. 29, 2007 which claims the benefit of PCT/FR2006/000898 filed on Apr. 19, 2006, the entire disclosures of which are hereby incorporated by reference herein.

The invention concerns the fabrication of plates or blanks of coated steel intended to be welded and then heat treated to obtain parts having good mechanical characteristics and good corrosion resistance.

BACKGROUND

Some applications require steel parts combining high mechanical strength, high impact resistance and good corrosion resistance. This type of combination is particularly desirable in the automotive industry which requires a significant reduction in vehicle weight and excellent capacity to absorb energy in the event of a collision. This can be achieved in particular by using steel with very good mechanical characteristics having a martensitic or bainitic-martensitic microstructure: anti-intrusion, structural or safety components of automotive vehicles such as bumpers, door reinforcements, B-pillar reinforcements or roof reinforcements, for example, require the above qualities.

Patent EP 0971044 discloses a fabrication method in which hot- or cold-rolled steel plate coated with aluminum of aluminum alloy is the starting material. After shaping to produce a part, and before heat treatment at a temperature above $A_{c1}$, the coating is heated to form a surface alloy by interdiffusion between the steel and the aluminum coating. This alloy prevents decarburization of the metal and oxidation during heat treatment in a furnace. It therefore eliminates the necessity for furnaces containing a special atmosphere. The presence of this alloy also obviates certain surface operations on the treated parts, such as shot blasting, which operations are necessary for plates having no coating. The parts are then cooled under conditions adapted to confer a tensile strength that can exceed 1500 MPa.

With the aim of reducing vehicle weights, parts have been developed consisting of steel blanks of different compositions or different thicknesses continuously butt-welded together. These welded parts are known as "butt-welded blanks". Laser beam welding is a preferred method of assembling such blanks, exploiting the flexibility, quality and productivity characteristics of the process. After these welded blanks have been cold-pressed, parts are obtained having mechanical strength, pressability, impact absorption properties that vary within the parts themselves. It is therefore possible to provide the required properties at the appropriate location without imposing an unnecessary or costly penalty on all of the parts.

The fabrication method described in patent EP 0971044 can be applied to butt-welded blanks in the following manner: starting from steel plate, possibly of different compositions or thicknesses, and having a metal pre-coating, butt-welded blanks are obtained by a welding process. These welded blanks then undergo heat treatment to form a surface alloy and are then hot-pressed and quenched. This produces quenched parts with thicknesses and intrinsic mechanical characteristics that vary and represent an ideal response to local loading requirements.

SUMMARY OF THE INVENTION

However, this fabrication method runs into considerable difficulties: when welding coated steel blanks, a portion of the initial surface pre-coating is transferred into the molten area created by the welding operation. These exogenous metal elements are concentrated in particular by strong convection currents in the liquid metal. These elements are segregated in particular in the interdendritic spaces in which the liquid fraction having the greatest concentration of dissolved elements is located. If austenizing follows with a view to quenching the welded blanks, these enriched areas become alloyed through interdiffusion with the iron or other elements of the matrix and form intermetallic areas. On subsequent mechanical loading, these intermetallic areas tend to be the site of onset of rupture under static or dynamic conditions. The overall deformability of the welded joints after heat treatment is therefore significantly reduced by the presence of these intermetallic areas resulting from welding and subsequent alloying and austenizing.

It is therefore desirable to eliminate the source of these intermetallic areas, namely the initial surface metal coating liable to be melted during butt-welding. However, eliminating this source itself gives rise to a serious problem: the precoated area on either side of the future welded joint can be eliminated, for example by a mechanical process. The width of this area from which the pre-coating is removed must be at least equal to that of the future area melted by welding so as not to encourage subsequent formation of intermetallic areas. In practice, it must be much more than this, to allow for fluctuations in the width of the molten area during the assembly operation. Thus there exist after the welding operation areas on either side of the welded joint that no longer have any surface metal pre-coating. During further alloying and austenizing heat treatment, scale formation and decarburizing occur within these areas located next to the weld. These are areas that tend to corrode when the parts go into service because they are not protected by any coating.

There is therefore a need for a fabrication process that prevents the formation of intermetallic areas within welded assemblies, which are sources of the onset of rupture.

There is also a need for a fabrication process such that the welded and heat treated parts have good corrosion resistance.

There is also a need for an economic fabrication process that can be integrated without difficulty into existing welding lines and that is compatible with subsequent pressing or heat treatment phases.

There is also a need for a product on which operations of butt-welding, then of heat treatment, pressing and quenching, lead to the fabrication of a part having satisfactory ductility and good corrosion resistance. One particular requirement is for a total elongation across the welded joint greater than or equal to 4%.

An object of the present invention is to solve the needs referred to above.

The present invention therefore provides a plate consisting of a steel substrate and a precoat consisting of a layer of intermetallic alloy in contact with the substrate, topped by a layer of metal alloy. On at least one precoated face of the plate, an area situated at the periphery of the plate has the metal alloy layer removed.

The precoat is preferably an alloy of aluminum or based on aluminum.

The metal alloy layer of the precoat preferably comprises, by weight, from 8 to 11% of silicon, from 2 to 4% of iron, the remainder of the compound being aluminum and inevitable impurities.

The width of the area from which the metal alloy layer has been removed is preferably between 0.2 and 2.2 mm.

The width of the area from which the metal layer has been removed preferably varies.

The thickness of the intermetallic alloy layer is preferably between 3 and 10 micrometers.

The area from which the metal alloy has been removed is preferably produced by partly eliminating the metal alloy layer on at least one precoated face of the plate by brushing.

The area from which the metal alloy has been removed can be produced by partially eliminating the alloy layer on at least one precoated face of the plate by means of a laser beam.

The present invention also provides a welded blank obtained by butt-welding at least two plates according to a preferred embodiment of the present invention, the welded joint being produced on the edge contiguous with the area from which the metal alloy has been removed.

The present invention further provides a part obtained by heat treatment and deformation of a welded blank according to a preferred embodiment of the present invention, the precoat being converted throughout its thickness by the heat treatment into an intermetallic alloy compound providing protection against corrosion and decarburization of the steel substrate.

The present invention even further provides a plate, blank or part according to a preferred embodiment, the composition of the steel comprising, by weight: $0.10\% \leq C \leq 0.5\%$, $0.5\% \leq Mn \leq 3\%$, $0.1\% \leq Si \leq 1\%$, $0.01\% \leq Cr \leq 1\%$, $Ti \leq 0.2\%$, $Al \leq 0.1\%$, $S \leq 0.05\%$, $P \leq 0.1\%$, $0.0005\% \leq B \leq 0.010\%$, the remainder consisting of iron and inevitable impurities resulting from the production process.

The composition of the steel preferably comprises, by weight: $0.15\% \leq C \leq 0.25\%$, $0.8\% \leq Mn \leq 1.8\%$, $0.1\% \leq Si \leq 0.35\%$, $0.01\% \leq Cr \leq 0.5\%$, $Ti \leq 0.1\%$, $Al \leq 0.1\%$, $S \leq 0.05\%$, $P \leq 0.1\%$, $0.002\% \leq B \leq 0.005\%$, the remainder consisting of iron and inevitable impurities produced by the production process.

The present invention additionally provides a part according to a preferred embodiment wherein the microstructure of the steel is martensitic, bainitic or bainitic-martensitic.

The present invention also provides a method that includes the steps of coating a steel plate to obtain a precoat including an intermetallic alloy layer topped by a metal alloy layer and, then, on at least one face of the plate, removing the metal alloy layer in an area at the periphery of the plate.

The width of the area may be preferably between 0.2 and 2.2 mm.

The invention further provides a method of fabricating a precoated steel plate that includes of coating a steel plate to obtain a precoat having an intermetallic alloy layer topped by a metal alloy layer, on at least one face of the plate, removing the metal alloy layer in an area not totally contiguous with the periphery of the plate and cutting the plate in a plane so that the area from which the metal alloy has been removed is at the periphery of the cut plate.

The width of the area from which the metal alloy has been removed and which is not totally contiguous with the periphery of the plate may be preferably between 0.4 and 30 mm.

The precoating is preferably effected by dip coating with aluminum.

The layer is preferably removed by brushing.

In a preferred embodiment the layer is removed by the impact of a laser beam on the precoat.

The invention also provides a method according to any one of the above embodiments in which the emissivity or reflectivity of the area over which the metal alloy layer is removed is measured, the measured value is compared with a reference value characteristic of the emissivity or reflectivity of the metal alloy layer, and the removal operation is stopped when the difference between the measured value and the reference value is above a critical value.

The present invention also provides a method wherein the layer is removed by means of a laser beam, characterized in that the intensity or wavelength of the radiation emitted at the point of impact of the laser beam is measured, the measured value is compared with a reference value characteristic of the emissivity of the metal alloy layer, and the removal operation is stopped when the difference between the measured value and the reference value is above a critical value.

The invention also provides a method wherein at least two plates fabricated according to any one of the above embodiments are butt-welded, the welded joint being produced on the edge contiguous with the area from which the metal alloy layer has been removed.

The width before welding of the area from which the metal layer has been removed at the periphery of the plate is preferably 20 to 40% greater than half the width of the weld.

The width of the area from which the metal alloy has been removed and which is not totally contiguous with the periphery of the plate is preferably 20 to 40% greater than the width of a weld.

The present invention also provides a part fabrication method wherein a welded blank fabricated according to a preferred embodiment of the present invention is heated to form, by alloying between the steel substrate and the coating, an intermetallic alloy compound, and so as to confer a partially or totally austenitic structure on the steel, then the blank is hot deformed to obtain a part. The part is cooled at a rate adapted to confer the target mechanical characteristics.

The rate of cooling is preferably above the critical rate for martensitic quenching.

In a preferred embodiment the welding is effected by a laser beam.

The welding is even more preferably effected by an electrical arc.

The present invention also provides a use of a plate, blank or part according to any one of the above embodiments for the fabrication of structural or safety parts for motorized terrestrial automotive vehicles.

BRIEF DESCRIPTION OF THE FIGURES

Other features and advantages of the invention will become apparent in the course of the description given hereinafter by way of example and with reference to the following appended figures.

DETAILED DESCRIPTION

As explained above, total elimination of the metal coating on either side of the joint before welding has led to localized corrosion problems. The inventors have surprisingly shown that eliminating a precise portion of the coating solves the problems referred to above.

To explain the present invention, there are explained first certain characteristics of coated strip or plate usually produced by immersion in baths of molten zinc or aluminum or zinc or aluminum alloys.

These continuous, so-called "dip" methods yield the following general morphology of the coatings:

At the surface of the steel substrate of the plate an intermetallic alloy a few micrometers thick is precipitated, formed by a very fast reaction on immersion in the molten bath. These intermetallic alloys being relatively fragile, inhibitors are added to the molten bath in an attempt to limit the growth of this layer. In the case of zinc or aluminum alloy coatings, the alloys constituting this layer are often of the $Fe_xAl_y$ type, in particular $Fe_2Al_5$. In the case of zinc alloy coatings, the presence of this aluminum-rich intermetallic layer is explained by the fact that the zinc baths often contain a small quantity of aluminum that plays an inhibitor role.

This layer of intermetallic alloys can sometimes be of a complex nature, for example divided into two intermetallic sub-layers, the sub-layer in contact with the substrate being richer in iron.

This layer of intermetallic alloys is topped by a metal alloy layer the composition of which is very close to that of the bath. A thicker or thinner metal layer is entrained by the plate as it leaves the molten bath, and this thickness can be controlled by means of jets of air or nitrogen.

The inventors have shown that it is necessary to eliminate this layer locally to solve the problems referred to above, which is particularly advantageous.

Figure 1:
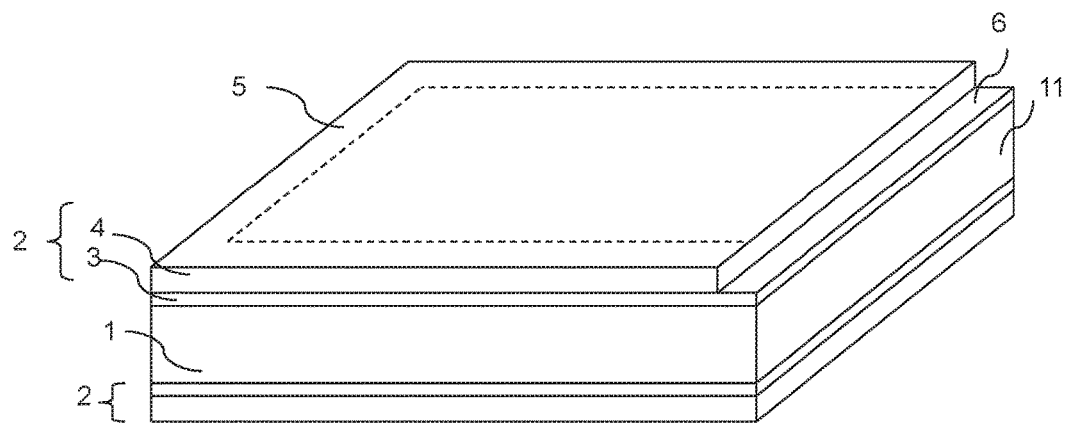
FIG. 1 is a diagram showing one embodiment of plate according to the present invention before welding.

Consider more particularly FIG. 1, showing a plate of the present invention. The term plate is to be understood in a broad sense and denotes in particular any strip or object obtained by cutting a strip, a coil or a sheet. In this particular example the plate has two faces and four edges. The present invention is not limited to this rectangular geometry, of course. FIG. 1 shows:

A steel substrate 1. This substrate can be of plate that is hot-rolled or cold-rolled, as a function of the required thickness, or of any other appropriate form.

Superposed on the substrate, and in contact therewith, a pre-coating 2 is present on the two faces of the part. This pre-coating itself consists of:

a layer of intermetallic alloy 3 in contact with the substrate 1. As already explained, this layer is formed by reaction between the substrate and the molten metal of the bath.

The precoat is advantageously an aluminum alloy or aluminum-based. This type of precoat is particularly suitable for subsequent heat treatment that forms an intermetallic compound by interdiffusion with the substrate 1 and (see below) localized removal of the surface layer. In particular, the metal alloy of the precoat can contain 8 to 11% by weight of silicon and 2 to 4% of iron, the remainder consisting of aluminum and inevitable impurities. Adding silicon enables reduction of the thickness of the intermetallic layer 3.

The periphery 5 of the plate is also shown. According to the invention, a portion 6 of the periphery does not carry the metal alloy layer 4 but retains the intermetallic alloy layer 3. This portion 6 is intended to be placed in contact with another plate and then to be butt-welded in a plane defined by the edge 11 to form a blank.

In a first embodiment, the layer 4 is advantageously removed by means of a brushing operation effected at the periphery 5: the material removed by the brush is essentially the surface layer, which has the lowest hardness, i.e. the metal alloy layer 4. The harder layer 3 will remain in place as the brush passes over it. Using an aluminum or aluminum-based precoat is particularly advantageous as the difference in hardness between the intermetallic alloy layer 3 and the metal layer 4 is very large.

The person skilled in the art will know how to adapt the various parameters specific to the brushing operation, such as the choice of the kind of brush, the speed of rotation and of relative movement in translation, the pressure perpendicular to the surface, to carry out the removal as completely and quickly as possible, adapting them to the particular nature of the precoat. For example, a wire brush mounted on a rotary shaft driven in translation parallel to the edge of the part 6 could be used.

In a second embodiment, the layer 4 is removed by a laser beam directed toward the periphery of the plate: interaction between this high energy density beam and the precoat causes vaporization and expulsion of the surface of the precoat. Given the different thermal and physical properties of the metal alloy layer 4 and the intermetallic layer 3, the inventors have shown that a succession of short laser pulses with appropriate parameters leads to selective ablation of the metal layer 4, leaving the layer 3 in place. The interaction of a pulsed laser beam directed toward the periphery of a coated plate and moved in translation relative to that plate therefore removes the peripheral metal layer 4. The person skilled in the art will know how to adapt the various parameters, such as the choice of laser beam, the incident energy, the pulse duration, the speed of relative movement in translation between the beam and the plate, and the focusing of the beam onto the surface to carry out the ablation as quickly and completely as possible, adapting them to the particular nature of the precoat. For example, a Q-switch laser could be used, having a nominal power of a few hundred watts and delivering pulses with a duration of the order of 50 nanoseconds. The width of the removal area 6 can naturally be varied by means of successive contiguous ablations.

The width of the area 6 from which the metal layer has been removed must be adjusted to enable:

welding with no introduction of any element of the precoat into the molten area, sufficient corrosion resistance of the welded assembly after subsequent alloying and austenizing heat treatment.

The inventors have shown that the above conditions are satisfied if the width of the area 6 is 20% to 40% greater than half the width of the molten area created when butt-welding blanks.

The minimum value of 20% ensures that the precoat is not introduced into the molten metal during welding, and the value of 40% ensures satisfactory corrosion resistance.

Given the welding conditions for plate from 1 to 3 mm thick, the width of the area 6 is between 0.2 and 2.2 mm.

Figure 3:
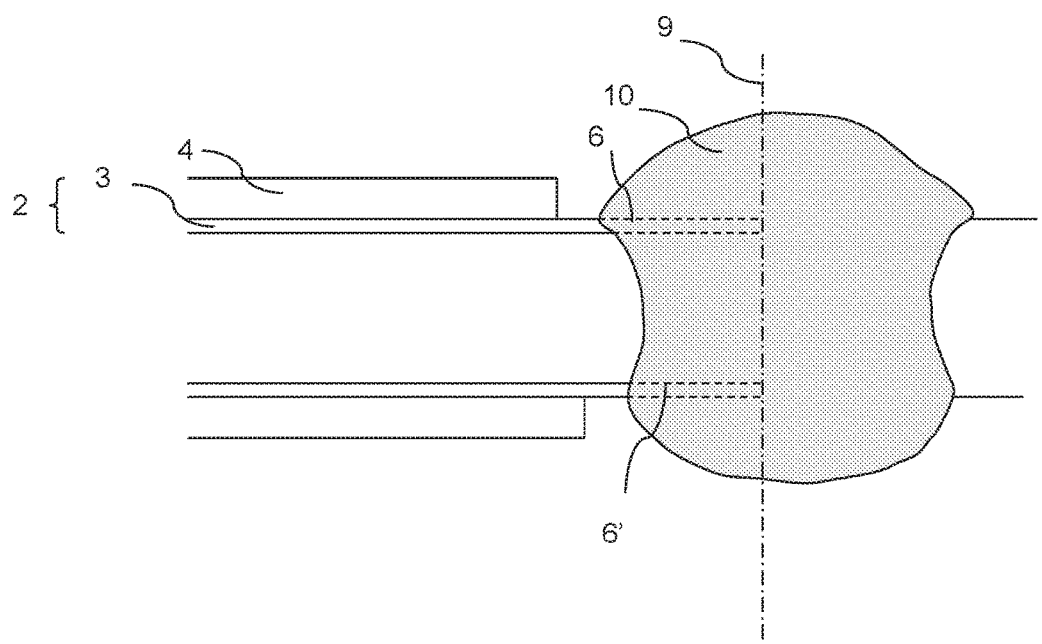
FIG. 3 is a diagram of an example of a butt-welded joint of the present invention.

This situation is represented in FIG. 3, which shows diagrammatically in section after welding plate comprising a precoat 2 formed of an intermetallic alloy layer 3 and a metal layer 4. The molten area 10 has its axial plane 9 in the welding direction. The dashed lines show the initial extent of an area 6 melted by the welding operation.

FIG. 3 illustrates the situation in which the weld is globally symmetrically on the two opposite faces of the plate. Under these conditions, the width of the area 6 is exactly the same on both faces. However, as a function of the welding process used and the parameters of that process, the weld can have an asymmetrical appearance. According to the invention, the width of the area 6 can then be coordinated to this asymmetry so that this width is slightly greater than half the width of the molten area 10 on each of the respective two faces. Under these conditions, the width of the area 6 differs from that of the area 6' shown in FIG. 3.

If welding conditions evolve during an assembly operation, for example to take account of local modification of geometry or thickness, the width of the area 6 can also be coordinated with the corresponding variation of the width of the molten area along the welded periphery of the plate. The width of the area 6 naturally increases if local conditions lead to the formation of a wider weld.

In the case of welding two coated plates of different thickness, the width of the area 6 can also be different on the welded peripheral portion of each of the two plates.

Figure 2:
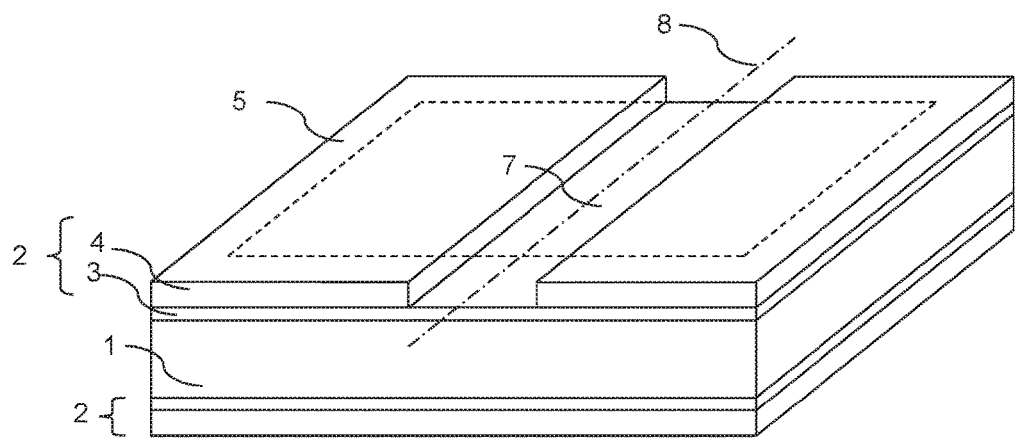
FIG. 2 is a diagram of a second embodiment of plate according to the present invention.

In a variant of the invention shown in FIG. 2, the layer 4 is removed over an area 7 of a coated plate that is not totally contiguous with the periphery 5 of the plate. The plate is then cut in an axial plane 8 perpendicular thereto, for example by a slitting process. A plate as shown in FIG. 1 is then obtained. The width removed is 20% to 40% greater than the width of the molten area that would be produced by a welding operation in the axial plane 8.

In one variant of the invention, the width removed is between 0.4 and 30 mm. The minimum value corresponds to a width such that cutting in the axial plane 8 produces two plates having a very narrow removal area 0.2 mm wide on each of the two plates. The maximum value of 30 mm corresponds to a removal width well suited to industrial tools for performing such removal. A subsequent cutting operation can be effected, not on the axial plane 8 situated in the middle of the removal area, but at a location adapted to produce a plate whose removal width is slightly greater than half the width of the molten area produced by a welding operation, defined by the conditions of the invention.

As explained above, the removed widths ensure that the metal coating is not introduced into the molten metal during subsequent welding of the plate and also that the welded blank is corrosion resistant after heat treatment.

Removal of the metal layer 4 can be monitored by means of micrographic examination. However, it has also been shown that the efficiency of the removal operation can be checked very quickly by optical inspection: there is a difference in appearance between the metal layer 4 and the underlying intermetallic layer 3, which is darker. The removal operation must therefore continue and be stopped when there is seen in the area 6 a significant change of tone relative to the surface coating. It is therefore possible to monitor removal by spectrometer reflectivity or emissivity measurement: the area 6 is illuminated by a light source, one or more optical sensors being directed towards this area. The measured value corresponds to the reflected energy. That value is compared with a reference value corresponding to the emissivity or reflectivity of the metal layer 4 or with a value measured by another sensor directed toward the metal layer. It is also possible to measure the variation of the reflected energy as a function of time. If the layer 6 is flush with the surface, the energy collected is lower than that corresponding to the metal alloy layer 4. The precise moment at which the removal operation reaches the layer 3 can therefore be determined by previous calibration.

In the case of coating removal by laser ablation, it is also possible to analyze the intensity or the wavelength of the radiation emitted at the point of impact of the laser beam on the precoated plate. The intensity and the wavelength are modified when the layer 4 has been eliminated and the laser beam impacts on the layer 3. The thickness of the layer removed can therefore be monitored in the following manner: the intensity or the wavelength of the radiation emitted at the point of impact of the laser beam is measured, that measured value is compared with a reference value characteristic of the emissivity of the metal alloy layer 4, and the removal operation is stopped when the difference between the measured value and the reference value is above a predetermined critical value.

Depending on specific constraints, this step of removing the metal alloy layer can be carried out at various stages of the production process, and in particular:
either after unwinding coils fabricated on continuous rolling mill trains, before cutting to form a smaller format plate,
or before welding the cut plate.

In the method of the invention, a hot- or cold-rolled steel plate with the following composition by weight is the starting material: carbon content between 0.10 and 0.5%, and preferably between 0.15 and 0.25% by weight. This element impacts greatly on the quenchability and on the mechanical strength obtained after cooling that follows the alloying and austenizing of the welded blanks. Below a content of 0.10% by weight, the quenchability is too low and the strength properties are insufficient. In contrast, beyond a content of 0.5% by weight, the risk of defects appearing during quenching is increased, especially for the thickest parts. A carbon content between 0.15 and 0.25% produces a tensile strength between about 1250 and 1650 MPa.

Apart from its role as a deoxidant, manganese also has a significant effect on quenchability, in particular if its concentration by weight is at least 0.5% and preferably 0.8%. However, too great a quantity (3% by weight, or preferably 1.8%) leads to risks of excessive segregation.

The silicon content of the steel must be between 0.1 and 1% by weight, and preferably between 0.1 and 0.35%. Apart from its role of deoxidizing the liquid steel, this element contributes to hardening. Its content must nevertheless be limited to avoid excessive formation of oxides and to encourage coatability.

Beyond a content above 0.01%, chromium increases quenchability and contributes to obtaining high strength after the hot forming operation, in the various portions of the part after cooling following the austenizing and alloying heat treatment. Above a content equal to 1% (preferably 0.5%), the contribution of chromium to obtaining homogeneous mechanical properties reaches saturation.

Aluminum favors deoxidation and precipitation of nitrogen. In amounts above 0.1% by weight, coarse aluminates form during production, which is an incentive to limit the content to this value.

Excessive quantities of sulfur and phosphorus lead to increased weakness. For this reason it is preferable to limit their respective contents to 0.05 and 0.1% by weight.

Boron, the content of which must be between 0.0005 and 0.010% by weight, and preferably between 0.002 and 0.005% by weight, has a large impact on quenchability. Below a content of 0.0005%, insufficient effect is achieved vis à vis quenchability. The full effect is obtained for a content of 0.002%. The maximum boron content must be less than 0.010%, and preferably 0.005%, in order not to degrade toughness.

Titanium has a high affinity for nitrogen and therefore contributes to protecting the boron so that this element is found in free form to have its full effect on quenchability. Above 0.2%, and more particularly 0.1%, there is however a risk of forming coarse titanium nitrides in the liquid steel, which have a harmful effect on toughness.

After preparation of the plate according to any of the methods described above, they are assembled by welding to obtain a welded blank. More than two plates can naturally be assembled to fabricate complex finished parts. The plates can be of different thickness or composition to provide the required properties locally.

Welding is effected after placing the plates edge-to-edge, the areas with no metal alloy layer being in contact with each other. Welding is therefore effected along the edge contiguous with the areas 6 where the metal alloy layer has been removed.

In the context of the invention, any continuous welding means can be used appropriate to the thicknesses and to the productivity and quality conditions required for the welded joints, and in particular:
 laser beam welding,
 electric arc welding, and in particular the GTAW (Gas Tungsten Arc Welding), plasma, MIG (Metal Inert Gas) or MAG (Metal Active Gas) processes.

Under the conditions of the invention, the welding operation does not lead to remelting of a portion of the metal coating 4, elements whereof would thereafter be found in the molten area. Only a minimal quantity of the intermetallic alloy layer 3 is remelted by this operation into the molten area. As the following example shows, this very limited quantity has no influence on the metallurgical quality or the mechanical properties of the welded joint after alloying and austenizing heat treatment.

Figure 5:
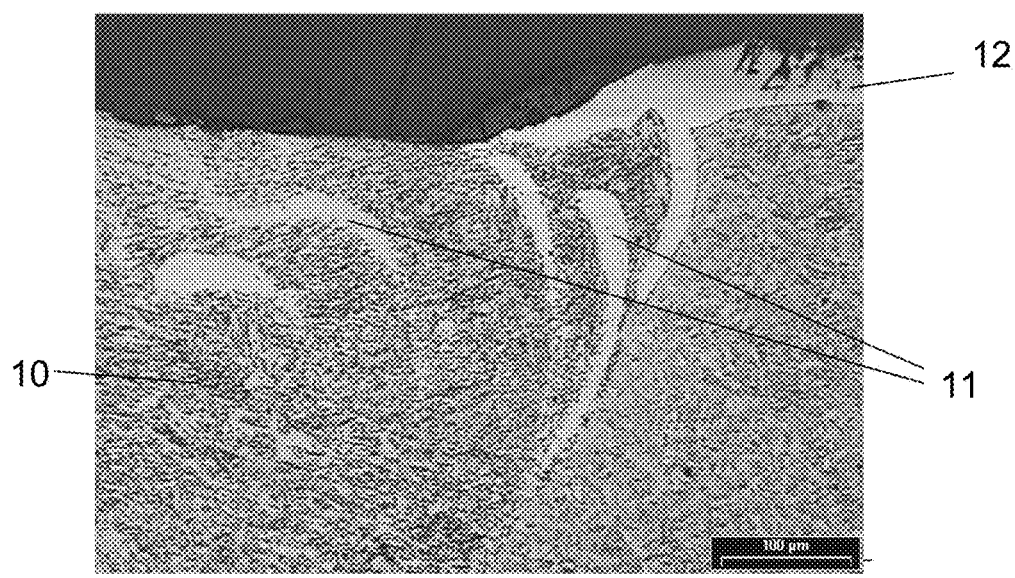
FIG. 5 is a macrograph of a reference welded joint showing the appearance of harmful intermetallic areas within the molten metal.

The welded blank is then heated to bring about conjointly:
 A surface alloying treatment in which elements of the steel substrate, in particular iron, manganese and silicon, diffuse into the precoat. This forms a surface intermetallic alloy compound 12 (FIG. 5) the melting point of which is significantly higher than that of the metal alloy layer 4. The presence of this compound during heat treatment prevents oxidation and decarburization of the underlying steel.
 Austenizing of the base steel, either partial or total. The heating is advantageously effected in a furnace so that the part reaches a temperature between Ac1 and Ac3+ 100° C. Ac1 and Ac3 are respectively the start and end temperatures of the austenitic transformation that occurs on heating. According to the invention, this temperature is maintained for a time greater than or equal to 20 s so as to render uniform the temperature and microstructure at the various points of the part.

Under the conditions of the present invention, during this heating phase, no brittle intermetallic areas are formed within the molten metal, which would be harmful to the mechanical properties of the part.

This is followed by hot deformation of the blank to its final shape as a part, this step being favored by the reduction of the creep limit and the increase of the ductility of the steel with temperature. Starting from a structure that is partly or totally austenitic at high temperature, the part is then cooled under appropriate conditions to confer the target mechanical characteristics: in particular, the part can be held in a tooling during cooling, and the tooling can itself be cooled to encourage the evacuation of heat. To obtain good mechanical properties, it is preferable to produce martensitic, bainitic or bainitic-martensitic microstructures.

In the area 6 on either side of the welded joint, the intermetallic layer 3, which is between 3 and 10 micrometers thick before heat treatment, is alloyed with the steel substrate and produces good corrosion resistance.

Example

The following embodiments show by way of example other advantages conferred by the present invention. They concern a cold-rolled steel strip 1.5 mm thick, with the following composition by weight:

TABLE 1

| Composition of the steel (% by weight) | | | | | | | | |
|---|---|---|---|---|---|---|---|---|
| C | Mn | Si | S | P | Al | Cr | Ti | B |
| 0.224 | 1.160 | 0.226 | 0.005 | 0.013 | 0.044 | 0.189 | 0.041 | 0.0031 |

The steel strip was precoated by dipping it in a molten bath of an aluminum alloy containing 9.3% of silicon and 2.8% of iron, the remainder consisting of aluminum and inevitable impurities. The strip was then cut into plates with a format of 300×500 mm$^2$. These have on each face a precoat comprising a layer of intermetallic alloy comprising mostly $Fe_2Al_3$, $Fe_2Al_5$ and $Fe_xAl_ySi_z$. This 5 micrometers thick layer in contact with the steel substrate has a 20 micrometers thick layer of Al—Si metal alloy on top of it.

Figure 6:
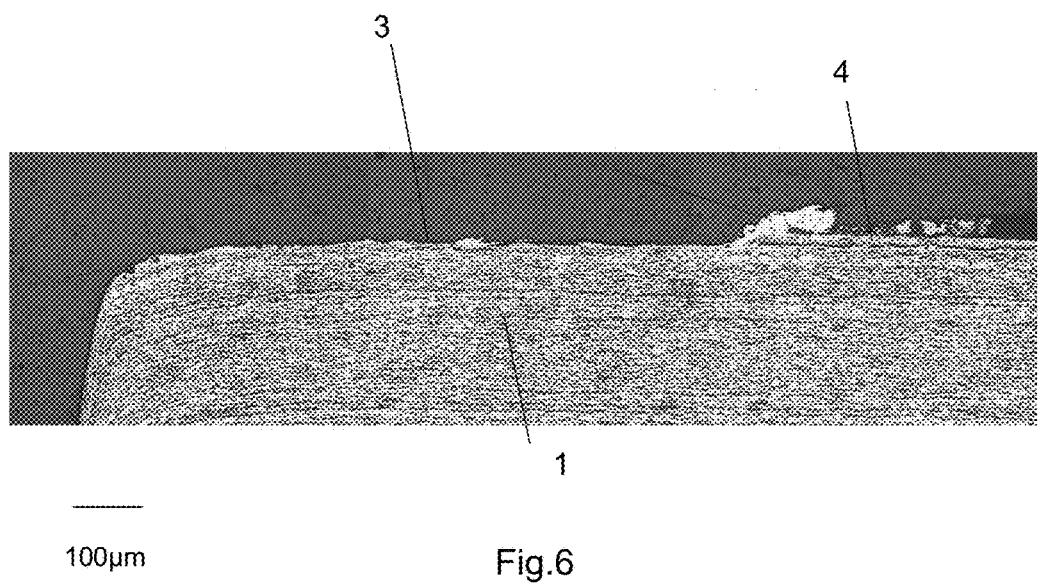
FIG. 6 is a macrograph of plate according to the present invention before welding, from which plate the metal alloy has been removed locally using a laser beam.

Before laser beam welding, four different preparation methods were used:
 Method I (according to the present invention): the Al—Si metal alloy layer was removed by longitudinal brushing over a width of 1.1 mm from the edge of the plate, on the 500 mm long side. Brushing was effected in exactly the same way on both faces using an 80 mm diameter "Spiraband" wire brush mounted on an angled rotary system, guided in movement in translation on a counterweight bench. The brushing force is approximately 35 N at the point of brush/blank contact, and the speed of movement of the brush 10 m/min. This brushing eliminates the metal alloy layer, leaving only the 5 micrometer intermetallic alloy layer in the brushed area.
 Method II (according to the present invention): the Al—Si metal alloy layer was removed by laser ablation over a width of 0.9 mm from the edge of the plate. The laser ablation was carried out in exactly the same way on both faces using a Q-switch laser with a nominal energy of 450 W delivering 70 ns pulses. The pulse energy is 42 mJ. The constant speed of movement in translation of the laser beam relative to the plate is 20 m/min. FIG. 6 shows that this laser ablation eliminates the metal alloy layer 4 leaving only the 5 micrometer intermetallic alloy layer 3 in the treated area.

Method R1 (not according to the invention): all of the precoat, comprising the metal alloy layer and the intermetallic alloy, was mechanically removed over a width of 1.1 mm, and therefore identical to that of method 1, by means of a carbide plate type tool for fast machining, in longitudinal translation. As a result, subsequent welding is carried out in an area with all of the precoat removed on either side of the joint.

Method R2 (not according to the invention): laser welding was effected on precoated plate with no particular preparation of the periphery.

The above plates were laser beam welded under the following conditions: nominal power: 6 kW, welding speed: 4 m/minute. Given the width of the weld, in method I, there is found the presence of an area with no metal alloy over a width of approximately 0.3 mm following production of the welded joints.

The welded blanks were subjected to alloying and austenizing heat treatment including heating to a temperature of 920° C., which was maintained for 7 minutes. These conditions lead to complete austenitic transformation of the steel of the substrate. During this heating and constant temperature phase, it is found that the aluminum-silicon-based precoat forms an intermetallic compound throughout its thickness by alloying with the base steel. This alloy coating has a high melting point and a high hardness, features high corrosion resistance, and prevents oxidation and decarburization of the underlying base steel during and after the heating phase.

After the phase of heating to 920° C., the parts were hot-deformed and cooled.

Subsequent cooling between jigs yielded a martensitic structure. The tensile R. of the steel substrate obtained after such treatment is above 1450 MPa.

The following techniques were then used to characterize the welded joints in the parts obtained in this way:
Micrographic sections show the presence of any intermetallic areas within the welded joints.
Mechanical tension tests across welded joints in samples 12.5×50 mm² determines the tensile strength R. and the total elongation.
Accelerated corrosion tests were carried out according to the DIN 50021, 50017, and 50014 standards. These tests include, following salt mist spraying, cycles alternating dry phases at 23° C. and wet phases at 40° C.

Table 2 sets out the results of these characterizations:

TABLE 2

Welded joint characteristics after heat treatment

| Method | Fragile intermetallic areas within welded joints | Rm (MPa) | A(%) | Corrosion resistance |
|---|---|---|---|---|
| I (according to the present invention) | None | >1450 | ≥4 | ○ |
| II (according to the present invention) | None | >1450 | ≥4 | ○ |
| R1 (not according to the invention) | None | >1450 | ≥4 | ● |
| R2 (not according to the invention) | Present | 1230 | ≤1 | ○ |

○: Satisfactory
●: not satisfactory

Under the quenching conditions required after heat treatment, the microstructure of the base metal and the molten area during welding is totally martensitic with the above four methods.

Figure 4:
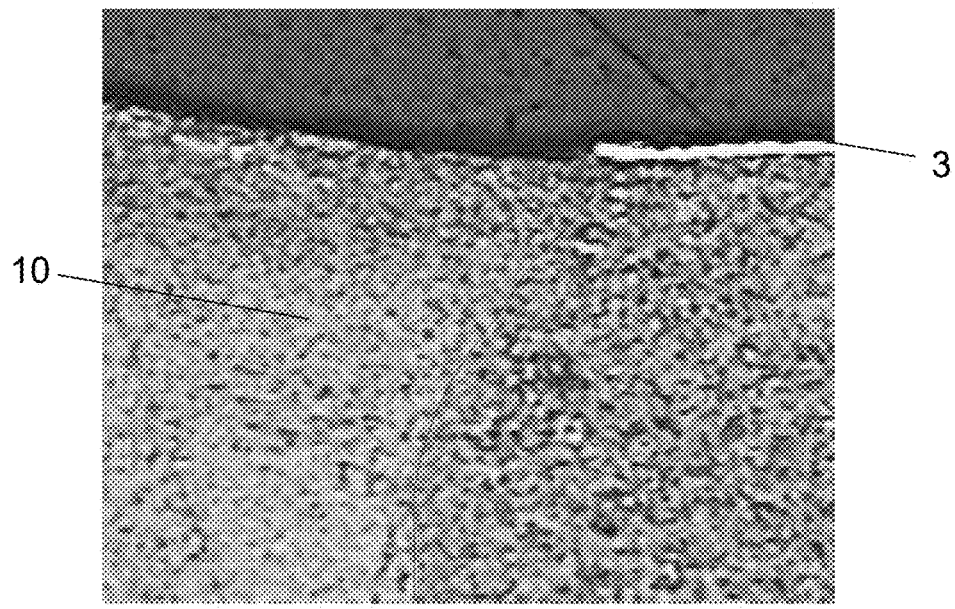
FIG. 4 is a macrograph of a welded joint of the present invention after austenizing and alloying heat treatment.

In the case of method I of the invention, the melted area contains no intermetallic area, as FIG. 4 shows.

On the other hand, in the method R2, note the presence of intermetallic areas 11 (see FIG. 5), in particular towards the periphery of the melted area 10 where the elements of the precoat were concentrated by spontaneous convection currents in the liquid bath caused by a Marangoni effect. These large intermetallic areas 11, which can be oriented substantially perpendicularly to the mechanical load, act as stress concentration and onset of rupture effects. Elongation in the crosswise direction is in particular reduced by the presence of these intermetallic areas: in the absence of these areas, the elongation is above 4%. It drops to below 1% when they are present.

No significant difference in mechanical characteristics (strength and elongation) is noted between the method I of the invention and the method R1. This indicates that the thin layer of intermetallic alloy 3 left in place by brushing and remelted by welding does not lead to the formation of brittle areas within the molten metal 10, as FIG. 4 shows.

In the case of the method R1, corrosion resistance is reduced: the steel is totally bared on either side of the welded joint by the total removal of the precoat. Lacking corrosion protection, red rust is then seen to appear in the heat-affected areas on either side of the weld.

Thus the method of the invention simultaneously achieves good ductility of the welded joint after treatment and good corrosion resistance.

Depending on the composition of the steel, in particular its carbon content and its manganese, chromium and boron content, the maximum strength of the parts can be adapted to the target use. Such parts will be used with profit for the fabrication of safety parts, and in particular anti-intrusion or underbody parts, reinforcing bars, B-pillars, for the construction of automotive vehicles.

What is claimed is:
1. A heat-treated part comprising:
a first steel plate having a first base, a first intermetallic alloy layer on the first base and a first metal alloy layer on the first intermetallic alloy layer; and
a second steel plate having a second base, a second intermetallic alloy layer on the second base and a second metal alloy layer on the second intermetallic alloy layer;
the first and second steel plates being butt-welded together at a weld, the weld including material from at least the first base, the first intermetallic alloy layer, the second base and the second intermetallic layer, the weld forming a heat-treated welded joint with a tensile strength in excess of 1450 MPa.

2. The heat treated part as recited in claim 1 wherein the first and second intermetallic layers are alloyed to the first and second bases, respectively.

3. The heat treated part as recited in claim 1 wherein the weld is free of brittle intermetallic areas.

4. The heat treated part as recited in claim 1 wherein the part has an elongation in a crosswise direction ≥4%.

5. The heat treated part as recited in claim 1 wherein the part is corrosion resistant in areas adjacent the weld.

6. The heat treated part as recited in claim 1 wherein the first and second steel parts are butt-welded at respective first and second edges of the first and second steel parts, and wherein the part is corrosion resistant at an area of the first steel part extending 0.2 mm from the first edge and at an area of the second steel part extending 0.2 mm from the second edge.

7. The heat treated part as recited in claim 1 wherein the first and second steel parts are butt-welded at respective first and second edges of the first and second steel parts, and wherein the part is corrosion resistant at an area of the first steel part extending 2 mm from the first edge and at an area of the second steel part extending 2 mm from the second edge.

8. The heat treated part as recited in claim 1, wherein the intermetallic alloy layer comprises iron and aluminum.

9. The heat treated part as recited in claim 1, wherein a thickness of the intermetallic layer is between 3 and 10 micrometers.

10. The heat treated part as recited in claim 9, wherein a thickness of the intermetallic layer is between 3 and 5 micrometers.

11. The heat treated part as recited in claim 9, wherein a thickness of the intermetallic layer is between 5 and 10 micrometers.

12. The heat treated part as recited in claim 1, wherein the first and second steel plates have different thicknesses.

13. The heat treated part as recited in claim 1, wherein the composition of the first and second bases comprise, by weight: $0.10\% \leq C \leq 0.5\%$, $0.5\% \leq Mn \leq 3\%$, $0.1\% \leq Si \leq 1\%$, $0.01\% \leq Cr \leq 1\%$, $Ti \leq 0.2\%$, $Al \leq 0.1\%$, $S \leq 0.05\%$, $P \leq 0.1\%$, $0.0005\% \leq B \leq 0.010\%$, the remainder consisting of iron and inevitable impurities resulting from the production process.

14. The heat treated part as recited in claim 1, wherein the composition of the first and second bases comprise, by weight: $0.15\% \leq C \leq 0.25\%$, $0.8\% \leq Mn \leq 1.8\%$, $0.1\% \leq Si \leq 0.35\%$, $0.01\% \leq Cr \leq 0.5\%$, $Ti \leq 0.1\%$, $Al \leq 0.1\%$, $S \leq 0.05\%$, $P \leq 0.1\%$, $0.002\% \leq B \leq 0.005\%$, the remainder consisting of iron and inevitable impurities produced by the production process.

15. The heat treated part as recited in claim 1, wherein the weld is totally martensitic.

16. The heat treated part as recited in claim 1, wherein the first and second metal alloy layers comprise aluminum and, by weight:
from 8 to 11% silicon; and
from 2 to 4% iron;
from 8 to 11% silicon; and
from 2 to 4% iron.

* * * * *